Patented Mar. 4, 1947

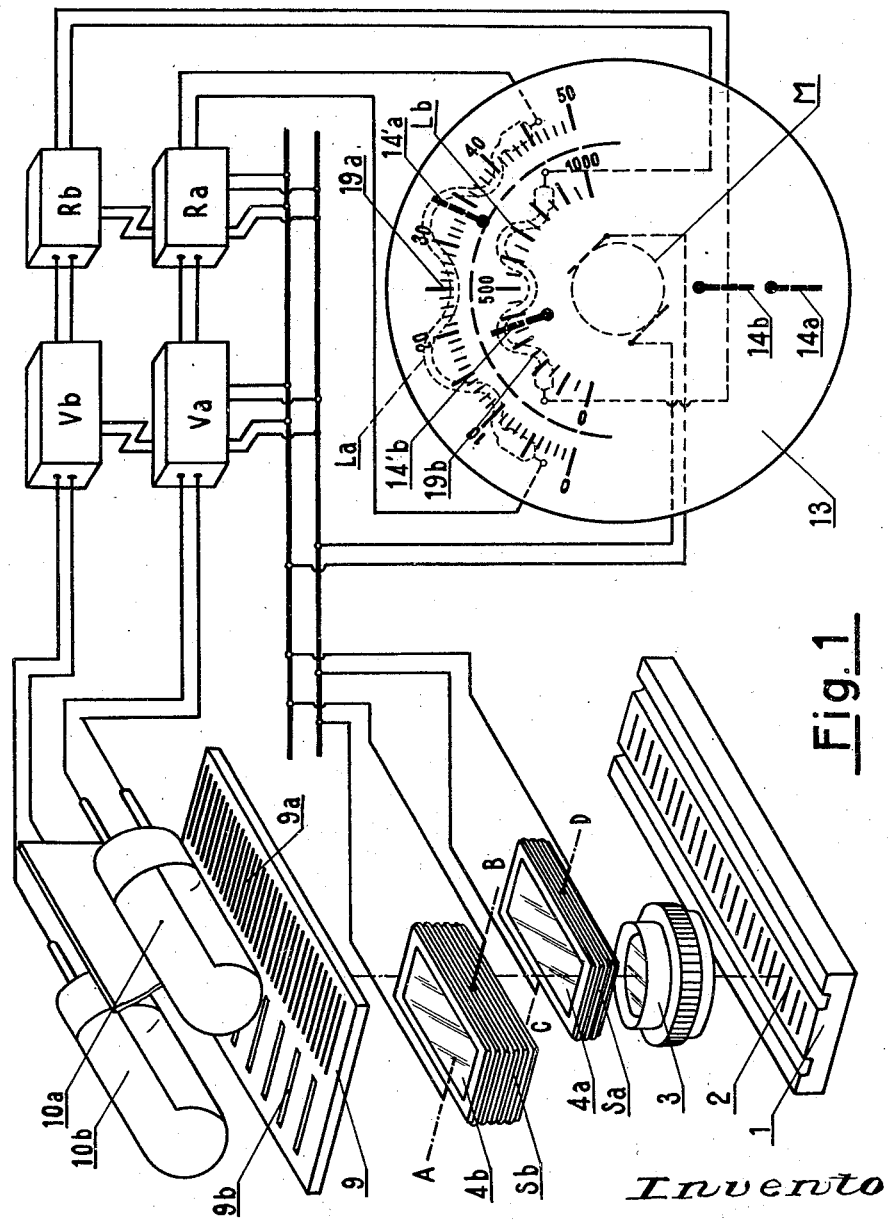

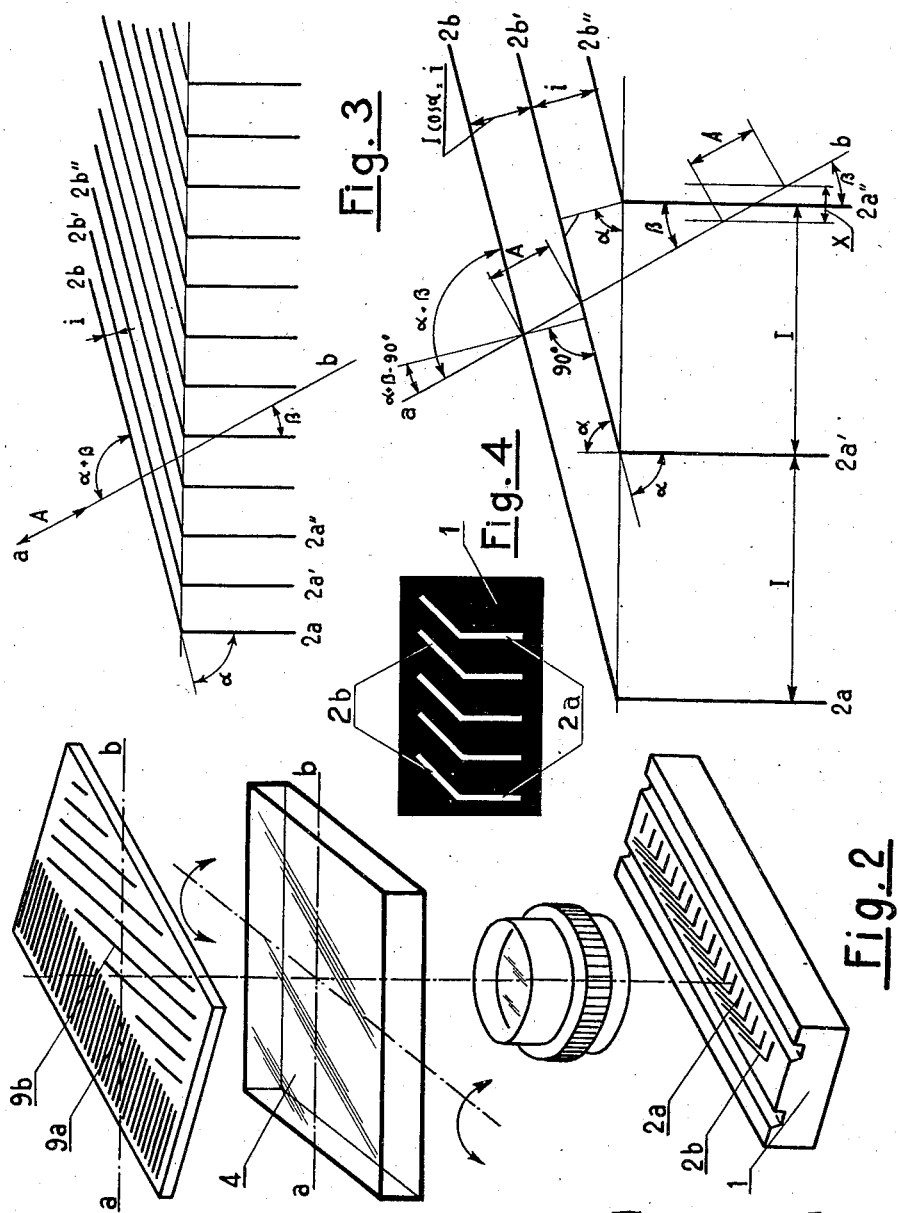

2,416,968

UNITED STATES PATENT OFFICE 2,416,968

STROBOSCOPIC DEVICE FOR DETERMINING ELECTRICALLY THE POSITIONS OF OBJECTS

Fernand Turrettini, Geneva, Switzerland, assignor to Societe Genevoise D'Instruments De Physique, Geneva, Switzerland, a firm of Switzerland Application May 25, 1944, Serial No. 537,320
In Switzerland June 21, 1943

3 Claims. (Cl. 250—41.5)

The present invention relates to improvements in stroboscopic devices for determining electrically the position of an object, and more particularly in a device of the kind which was the object of the prior application, Serial No. 445,924, filed June 5, 1942. This prior device comprised an objective facing the object, a deflector mounted for oscillating movement behind that objective, a synchronous oscillator maintaining the oscillations of the deflector, a grid interposed after the deflector, a photoelectric cell placed behind the grid, a relay amplifier connected to this cell, an instantaneous flash lamp connected with this amplifier, and an observation member carrying at least one index and one mark, said member being lighted by said lamp and driven by a synchronous motor, so that the flux of light resulting from the image of the object to be positioned, projected by the objective and oscillating owing to the deflector, was coming to coincide periodically with the slit of the grid and to strike the cell, whose amplified reaction caused the lamp to throw flashes of light on the observation member, the index of the latter appearing, in relation to the mark, in variable position reproducing greatly enlarged the variation of position of the object in relation to the axis of the optical system.

This device gives very satisfactory results with respect to precision, but it possesses the inconvenience of enabling to determine the position of an object within narrow limits only, the latter depending from the magnification of the device and being inversely proportional to it.

The magnification is the ratio between the circumferential speed of a rotary index together with a rotary observation scale and the linear speed of oscillation of the image on the grid.

As this device is destinated for metrological work in which the micron (0.001 mm.) is the current unit of measure, and which should permit to easily observe the microns with the naked eye, as well as to readily estimate the tenths of micron on the observation scale, it is clear that the magnification should be at least of the order of a thousand to one, so that the device may render the services expected.

The dimensions and the speed of rotation of the rotary disc which bears the index and the observation scale, as well as the intensity of illumination produced by the instantaneous flash lamp, being limited for reasons of a constructional nature, it follows that, in order to obtain a high magnification, the linear speed of oscillation of the image on the grid has to be very small. This also applies to the amplitude of the oscillating movement which should possess a frequency of at least twenty per second in order that the retinal persistance of the observer furnishes him the impression of a continuous illumination.

Practically, the amplitude of the oscillating movement of the image on the grid cannot exceed some hundredths of a millimetre, if the device has to possess a magnification of thousand to one.

Thus, it is not possible to use the device according to the above mentioned application in order to determine the position of an object bearing a millimetric graduation by viewing, by means of the optical system of the device, any given point within a millimetric interval, as the image of the division cannot oscillate on the grid with an amplitude of a millimetre if a high degree of magnification is required.

It is an object of the present invention to eliminate the inconveniences mentioned above and to provide an improved device for determining electrically the position of an object comprising at least one graduation, enabling to carry out measurements at any given point of an interval, for example a millimetre, and obtain at the same time a high magnification.

Other objects will appear from the following description, reference being had to the accompanying drawings in which:

Fig. 1 is a schematic view of a first embodiment of the device.

Fig. 2 is a part view of a second embodiment of the device.

Fig. 3 is a diagrammatic explanation of a detail.

Fig. 4 shows an alternative of a detail.

In the embodiment according to Fig. 1, the graduated scale serving to determine the position of the object is shown in 1, this scale comprises a millimetric graduation 2. The image of the graduation is projected by the objective 3, through the vibrating adjacent deflectors 4a and 4b facing each half of the objective 3, on to a screen 9 comprising a row of slots 9a, the distance between said slots corresponding for example to an interval of 0.05 mm. and a second row of slots 9b spaced to correspond to an interval of 1 mm. of the graduation 2. The deflector 4b oscillates about the axis A—B with such an amplitude that the total length of the graduation 19b corresponds exactly to an interval of 1 mm. on the scale 1. Similarly, the deflector 4a oscillates about the axis C—D with such an amplitude that the total length of the graduation 19a corresponds exactly to an interval of 0.05 mm. on the scale 1. Behind the rows of slots 9a and 9b are arranged the photo-electric cells 10a and 10b. The latter are connected to the amplifiers Va and Vb which operate the relays Ra and Rb feeding the flash lamps La and Lb from the net. The latter feed simultaneously the coils Sa, Sb of the oscillating deflectors 4a, 4b, as well as the synchronous motor M driving the observation disc 13.

The electrical circuit causes the illumination of the observation scales 19a and 19b carried by the rotary disc 13, which also comprises the indexes 14a and 14b. The graduation 19a, on which will appear the index 14a according to the position of the object, is the graduation with a high magnification; it comprises a scale with fifty intervals, each corresponding to one micron. The graduation 19b, on which will appear the index 14b according to the position of the object, is the graduation with a low magnification, its total length represents one millimetre and is subdivided into twenty intervals, each corresponding to 0.05 mm.

Millimetric divisions have been mentioned in order to give a general idea, the device may be applied to any other system with a different length unit, for example fractions of an inch.

The operation of the device is as follows:

The graduation of the object may be simultaneously observed magnified at two different ratios. When the object moves to the amount of one millimetre, for example, one of the indexes moves over the whole low-magnification graduation, whereas the other index moves twenty times over the whole length of the graduation with high magnification.

Thus, it will be possible to make observations from micron to micron without discontinuity within the interval of a millimetre, completing the indications on the second graduation by means of those given by the first one.

In order to ascertain the efficient working of the cell arranged behind the series of slots spaced at 0.05 mm., of which only one in twenty may simultaneously coincide with the image of the millimetric graduation, the latter may be formed for example by luminous lines on a dark ground.

If the position of the object is such that when working, the index 14a appears in 14'a and the index 14b in 14'b, the total reading on both graduations will be 0.384 mm. (0.35+0.034).

The glass plate, forming the oscillating deflector 4b, must necessarily be much thicker and carry out a vibration of a greater amplitude than that of the deflector 4a, in order to cause on the grid 9b a displacement of the image fifty times larger than on the grid 9a.

It would be difficult to maintain the vibration of a thick, and consequently heavy plate, with a high amplitude without such vibration being transmitted to the whole device.

The embodiment according to Fig. 2 eliminates this inconvenience and enables to make use of a single deflector only, carrying out small vibratory movements in a given direction. This is being made possible by employing an expedient when tracing the graduation 2. It consists in tracing on the rule 1 two graduations, the lines of which form a distinct angle, according to Fig. 3, when the graduation 2a represents for example a millimetric graduation and the graduation 2b a slanting graduation, the lines of which form an angle $\alpha$ with the lines of the first graduation 2a. The intervals I of the graduation 2b are equal to the intervals I of the graduation 2a multiplied by the cosine of the angle $\alpha$ and are therefore much narrower than the intervals I. Both graduations, showing the same longitudinal pitch, characterize millimetric intervals.

One single deflector 4, vibrating about an axis arranged in such a way that it moves the image in the direction A—A, may then be used. This direction forms with the lines 2a, 2'a, 2''a an angle $\beta$ and consequently, an angle $\alpha+\beta$ with the lines 2b, 2'b, 2''b, etc. This deflector must produce the oscillation of the image with an amplitude A.

If it is required that on the graduation 2b, the amplitude A of the oscillation be equal to the interval between the lines 2b, 2'b, 2''b, measured in the direction A—A, we obtain:

$$\frac{I.\cos \alpha}{\sin (\alpha+\beta)}$$

If, on the other hand, the amplitude A of the oscillation has to cause a lateral displacement of $x=0.05$ mm. of the image of the lines 2a, 2'a, 2''a, we have:

$$A=\frac{0.05}{\sin \beta}$$

These two equations permit to compute the angle $\beta$ in function of $\alpha$ in the desired effect on the two grids 9a and 9b of Fig. 2, which correspond to the arrangement of the graduations 2a and 2b on the rule.

This embodiment possesses the great advantage of using one deflector only vibrating with a small amplitude.

It is clear that all the numerical indications given above are furnished by way of example only.

What I claim is:

1. In a stroboscopic device for determining electrically the position of an object carrying at least one graduation, the lines of the graduation lying at an angle to its direction of motion, said device comprising an objective facing the graduation, at least one optical deflector arranged to oscillate continuously behind said objective, a synchronous oscillator maintaining the oscillations of the deflectors, a screen showing at least two series of slots with different pitches on which the image of the graduation is continuously moving, said screen being arranged behind the deflector, and a photoelectric cell arranged behind each series of slots, with an amplifier and a relay connected to each cell, in combination, an instantaneous flash lamp connected to each relay and a stroboscopic observation disk carrying at least two indexes and two graduations, said indexes being diametrically opposed to the graduations, said disk being illuminated by said flash lamps and driven by a synchronous motor, for reproducing at two different ratios of magnification the variations of the position of the object in relation to the axis of the objective.

2. In a stroboscopic device as claimed in claim 1, wherein the object carries two graduations with the same longitudinal pitch, in combination, the fact that the lines of one graduation form an angle with those of the other graduation, the screen having two series of slots forming between them the same angle as the lines of the graduations of the object, and the amplitude of the oscillation of the deflector moving the image of the two graduations on both series of slots of the screen in an alternating motion the amplitude of which corresponds to the spacing between the slots measured in the direction of the motion of the image.

3. In a stroboscopic device as claimed in claim 1, in combination, the fact that the object carries at least one graduation consisting of luminous lines on a dark ground.

FERNAND TURRETTINI.

REFERENCES CITED

The following references are of record in the file of this patent:

UNITED STATES PATENTS

| Number | Name | Date |
| --- | --- | --- |
| 2,375,665 | Koulicovitch | May 8, 1945 |

FOREIGN PATENTS

| Number | Country | Date |
| --- | --- | --- |
| 619,153 | German | Sept. 23, 1935 |